United States Patent [19]

Sakai

[11] Patent Number: 5,253,480
[45] Date of Patent: Oct. 19, 1993

[54] AUTOMATIC ICE MAKING MACHINE
[75] Inventor: Tadashi Sakai, Toyoake, Japan
[73] Assignee: Hoshizaki Denki Kabushiki Kaisha, Toyoake, Japan
[21] Appl. No.: 932,183
[22] Filed: Aug. 20, 1992
[30] Foreign Application Priority Data Aug. 21, 1991 [JP] Japan .................. 3-73780[U]

[51] Int. Cl.$^5$ ............................... F25C 5/18
[52] U.S. Cl. ........................ 62/78; 62/137; 62/298; 439/131
[58] Field of Search ........... 62/137, 66, 78, 298; 439/131

[56] References Cited

U.S. PATENT DOCUMENTS

| | | | |
|---|---|---|---|
| 3,045,444 | 7/1962 | Todd | 62/137 |
| 3,192,734 | 7/1965 | Swanson | 62/137 |
| 3,911,691 | 10/1975 | Kohl et al. | 62/137 |
| 4,610,147 | 9/1986 | Kawasumi | 62/137 |
| 4,947,652 | 8/1990 | Arcangeli | 62/137 X |
| 4,966,008 | 10/1990 | Yoshida et al. | 62/137 |
| 4,993,232 | 2/1991 | Tatematsu et al. | 62/137 |

FOREIGN PATENT DOCUMENTS 2-103672 8/1990 Japan .

Primary Examiner—William E. Tapolcai
Attorney, Agent, or Firm—Nikaido, Marmelstein, Murray & Oram

[57] ABSTRACT

An automatic ice making machine of the type which includes an ice making unit provided therein with an electric control apparatus for an ice making mechanism contained therein and combined with an ice storage bin to store therein an amount of ice cubes or chips formed by operation of the ice making mechanism under control of the electric control apparatus, wherein an ice detection element is previously contained within the ice making unit to be inserted into the interior of the ice storage bin after installation of the ice making unit on the ice storage bin for deactivating the electric control apparatus when detected the ice cubes fully stored in the ice storage bin, wherein a connector for connection to a source of electricity is connected to the electric control apparatus by means of conductive wires and arranged within the ice making unit to disconnect the electric control apparatus from the source of electricity when the ice detection element is remained in the ice making unit and to connect the electric control apparatus to the source of electricity only when the ice detection element has been inserted into the interior of the ice storage bin.

3 Claims, 3 Drawing Sheets

AUTOMATIC ICE MAKING MACHINE

BACKGROUND OF THE INVENTION

1. Field of the invention

The present invention relates to an automatic ice making machine of the stack-on type which includes an ice making unit provided therein with an electric control apparatus for its ice making mechanism and combined with an ice storage bin to store therein an amount of ice cubes or chips formed by operation of the ice making mechanism under control of the electric control apparatus.

2. Description of the Prior Art

Disclosed in Japanese Utility Model Laid-open Publication No. 2-103672 is an automatic ice making machine of this kind wherein an ice detection device is previously contained within the ice making unit to be inserted into the interior of the ice storage bin after installation of the ice making unit on the ice storage bin. In operation of the ice making machine, the ice detection device acts to detect the ice cubes fully stored in the ice storage bin thereby to deactivate the ice making mechanism under control of the electric control apparatus for avoiding overflow of the ice cubes from the storage bin. It has been, however, experienced that the ice detection device is carelessly remained within the ice making unit without inserted into the ice storage bin, resulting in overflow of the ice cubes from the storage bin during operation of the ice making machine.

SUMMARY OF THE INVENTION

It is, therefore, a primary object of the present invention to provide an automatic ice making machine capable of avoiding such a problem as described above.

According to the present invention, the object is accomplished by providing an automatic ice making machine of the type which includes an ice making unit provided therein with an electric control apparatus for an ice making mechanism contained therein and combined with an ice storage bin to store therein an amount of ice cubes or chips formed by operation of the ice making mechanism under control of the electric control apparatus, wherein an ice detection element is previously contained within the ice making unit to be inserted into the interior of the ice storage bin after installation of the ice making unit on the ice storage bin for deactivating the electric control apparatus when detected the ice cubes fully stored in the ice storage bin, wherein a connector for connection to a source of electricity is connected to the electric control apparatus by means of conductive wires and arranged within the ice making unit to disconnect the electric control apparatus from the source of electricity when the ice detection element is remained in the ice making unit and to connect the electric control apparatus to the source of electricity only when the ice detection element has been inserted into the interior of the ice storage bin.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
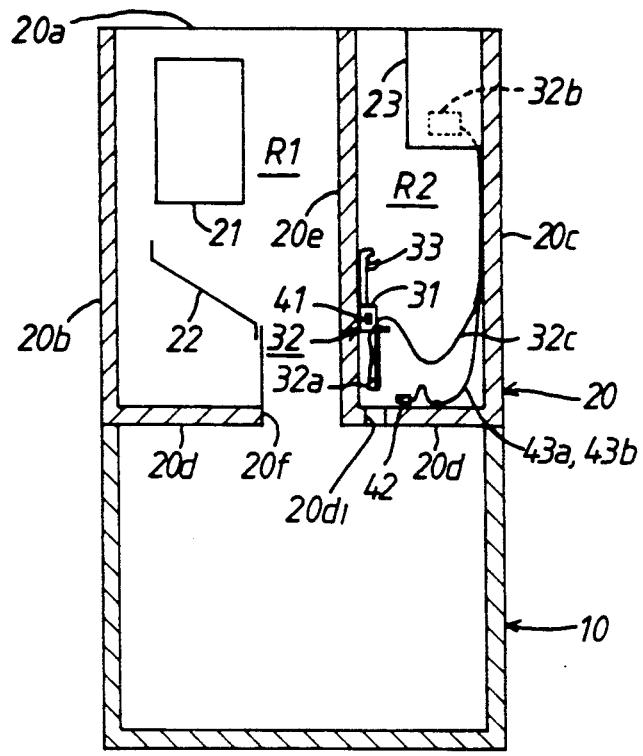
FIG. 1 is a vertical sectional view of an automatic ice making machine of the stack-on type, showing an ice detection element assembled within an ice making unit.
Figure 3:
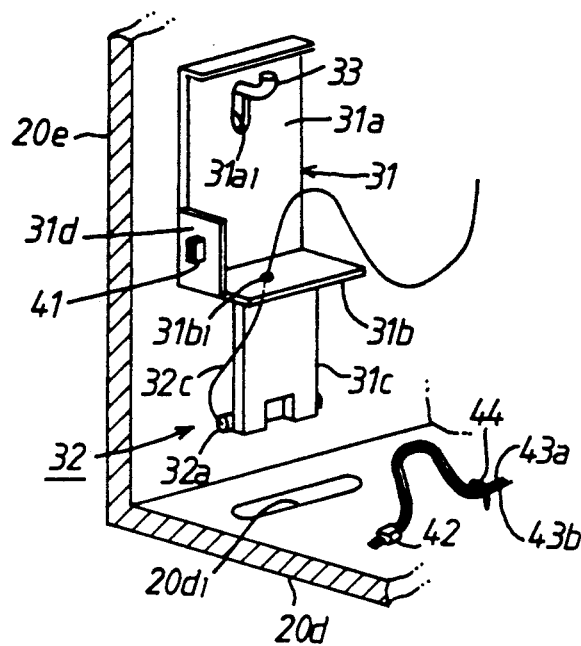
FIG. 3 is an enlarged perspective view of the ice detection device shown in FIG. 1.

In FIG. 1 of the drawings, there is illustrated an automatic ice making machine which includes a cubiform ice storage bin 10 and an ice making unit 20 combined with the storage bin 10. The ice making unit 20 has a cubiform housing formed with a ceiling plate 20a, side panels 20b, 20c, a bottom panel 20d and front and rear panels (not shown). The interior of the housing is subdivided into an ice making chamber R1 and a control chamber R2 by means of a partition wall 20e. Assembled within the ice making chamber R1 is an ice making mechanism 21 which is arranged to produce ice cubes or chips in operation. The ice cubes formed at the ice making mechanism are introduced downward along a guide plate 22 and fall into the ice storage bin 10 through an opening 20f of bottom panel 20d. Assembled within the control chamber R2 are an electric control apparatus 23 for control of the ice making mechanism 21 and an ice detection device 32 having an ice detection element 32a carried by a support plate 31. As shown in FIGS. 1 and 3, the support plate 31 has a vertical portion 31a, a horizontal portion 31b and a projection 31c extending downward from the horizontal portion 31b. The vertical portion 31a of support plate 31 is formed with an elongated hole $31a_1$ at which the support plate 31 is hung on a hook 33 fixed to the partition wall 20e. The height of hook 33 from the bottom panel 20d is determined to be larger than the vertical length of support plate 31 so that the entirety of support plate 31 is contained within the control chamber R2. The bottom panel 20d is formed with an elongated hole $20d_1$ through which the projection 31c of support plate 31 is inserted into the interior of the ice storage bin 10. When the projection 31c of support plate 31 has been inserted into the interior of ice storage bin 10, the horizontal portion 31b of support plate 31 is engaged with the bottom panel 20d to retain the support plate 31 in place.

The ice detection element 32a is fixedly mounted to the lower end of projection 31c of support plate 31 and is connected to a pressure switch 32b in the electric control apparatus 23 by means of a flexible hollow cable 32c. The ice detection element 32a is in the form of a copper tube filled with gas the pressure of which is applied to the pressure switch 32b through the flexible hollow cable 32c. The flexible hollow cable 32c is extended upward through a small hole $31b_1$ of horizontal portion 31b of support plate 31 and introduced into the electric control apparatus 23 for connection to the pressure switch 32b. The pressure switch 32b is normally maintained in a closed position to be opened when the pressure in the ice detection element 32a decreases due to drop of the temperature at the ice detection element 32a.

Figure 5:
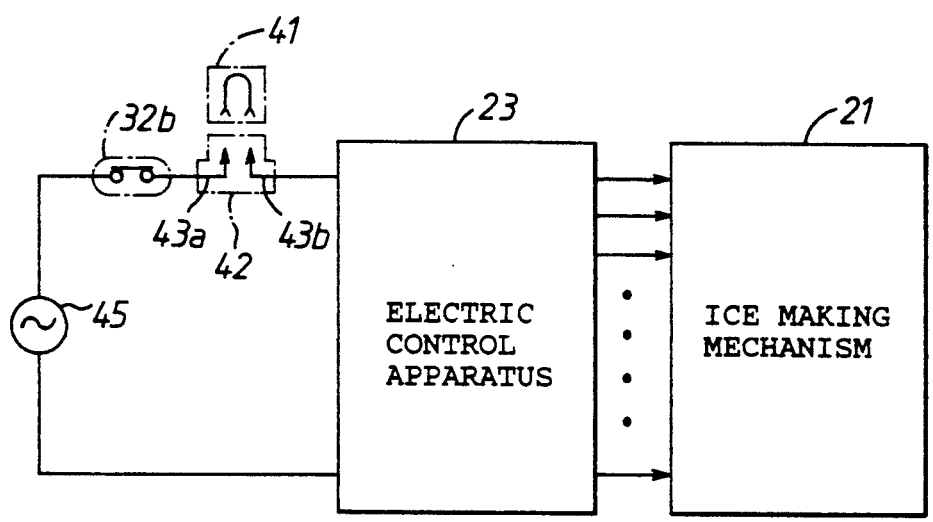
FIG. 5 is a block diagram of an electric control apparatus for the ice making machine shown in FIG. 1.

A receptacle 41 is attached to a relatively small side plate 31d secured to the support plate 31, while a plug 42 is connected to a pair of conductive wires 43a, 43b extended from the electric control apparatus 23. When the plug 42 is coupled with the receptacle 41, the conductive wires 43a, 43b are shorted through the receptacle 41 to activate the electric control apparatus 23. The conductive wires 43a, 43b are extended downwardly along the side panel 20c of unit 20 and placed on the bottom panel 20d. Thus, the conductive wires 43a, 43b are fixed at one portion thereof to the bottom panel 20d by means of a retainer 44 and loosened for connection of the plug 42 to the receptacle 41. The loosened length of conductive wires 43a, 43b is determined in such a manner that the plug 42 may not be coupled with the receptacle 41 when the support plate 31 is hung on the hook 33 and can be coupled with the receptacle 41 when the projection 31c of support plate 31 has been inserted into the interior of ice storage bin 10 to be exposed to ice cubes stored therein. As shown in FIG. 5, the pressure switch 32b and plug 42 are connected in series between the electric control apparatus 23 and a source of electricity 45. Thus, the electric control apparatus 23 is supplied with the power from the source of electricity 45 only when the plug 42 has been coupled with the receptacle 41.

Figure 2:
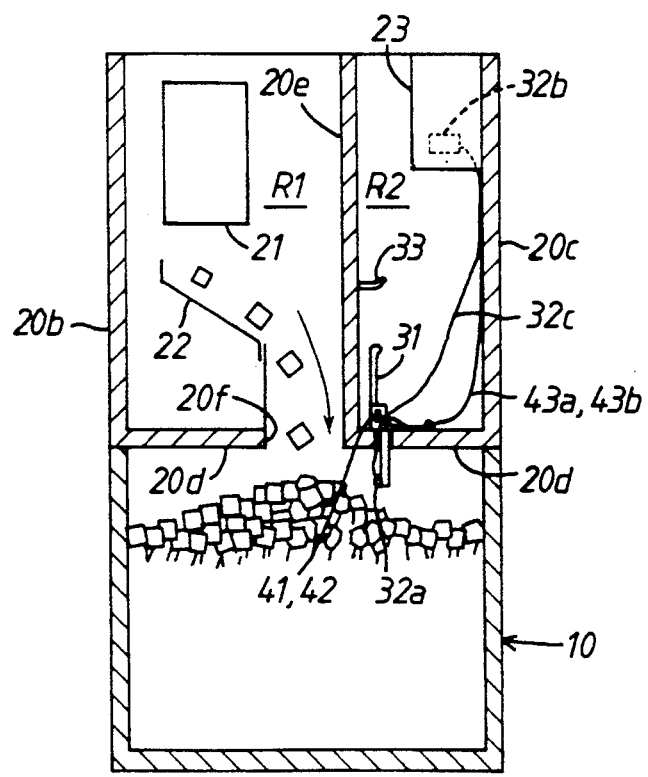
FIG. 2 is a vertical sectional view of the ice making machine, showing the ice detection device inserted into the interior of an ice storage bin.
Figure 4:
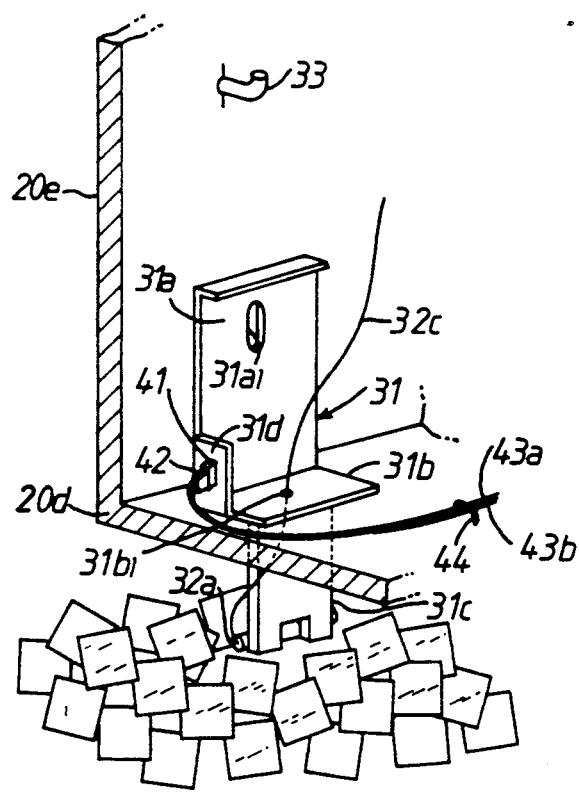
FIG. 4 is an enlarged perspective view of the ice detectional device shown in FIG. 2.

When the ice making machine is transported to a user, the ice storage bin 10 and ice making unit 20 are separately packaged for transport. In this instance, the ice detection device 32 is contained within the ice making unit 20 in a condition where the support plate 31 has been hung on the hook 33 at its elongated hole 31a₁. When the ice making machine is installed at the user's side, the ice making unit 20 is mounted on the ice storage bin 10. In such installation of the ice making machine, the front panel of the housing of unit 20 is opened, and the support plate 31 is removed from the hook 33. Subsequently, as shown in FIGS. 2 and 4, the projection 31c of support plate 31 is inserted into the interior of ice storage bin 10 through the elonaged hole 20d₁ of bottom panel 20d, and the support plate 31 is engaged at its horizontal portion 31b with the bottom panel 20d to retain the ice detection element 32a in place. In this instance, it is desirable that the horizontal portion 31b of support plate 31 is secured to the bottom panel 20d by means of adhesive agent or fastening screws. Thereafter, the plug 42 is coupled with the receptacle 41 to connect the electric control apparatus 23 to the source of electricity 45 through the pressure switch 32b. Thus, the installation of the ice making machine is finished by closing the front panel of ice making unit 20.

In such a condition as described above, the pressure 32b is normally maintained in its closed position to permit the supply of electric power to the electric control apparatus 23. In operation of the ice making mechanism 21 under control of the electric control apparatus 23, ice cubes formed by the ice making mechanism 21 are introduced by the guide plate 22 toward the opening 20f of bottom panel 20d of unit 20 and fall into the ice storage bin 10. When the ice storage bin 10 is filled with the ice cubes, the ice detection element 32a is embedded into and cooled by the stored ice cubes to decrease the pressure of gas contained therein. As a result, the pressure switch 32b is opened to disconnect the electric control apparatus 23 from the source of electricity 45. In turn, the electric control apparatus 23 becomes inoperative to deactivate the ice making mechanism 21 so as to avoid overflow of the ice cubes from the ice storage bin 10. When the stored ice cubes are taken out from the storage bin 10 for use, the pressure switch 32b is closed to activate the electric control apparatus 23 for control of the ice making mechanism 21.

If the support plate 31 is still hung on the hook 33 after installation of the ice making machine, the ice detection element 32a is remained in the ice making unit 20 without inserted into the ice storage bin 10. In such a situation, the plug 42 may not be coupled with the receptacle 41 due to the limited length of conductive wires 43a, 43b at their loosened portions. As a result, the electric control apparatus 23 is maintained inoperative due to disconnection from the source of electricity 45. With such an arrangement of the ice detection element 32a as described above, the ice making machine is maintained inoperative if the ice detection element 32a is remained in the ice making unit 20. Accordingly, an incomplete installment of the ice making machine can be easily recognized.

What is claimed is:

1. An automatic ice making machine of the type which includes an ice making unit provided therein with an electric control apparatus for an ice making mechanism contained therein and adapted to be installed on an ice storage bin to store therein an amount of ice cubes or chips formed by operation of said ice making mechanism under control of said electric control apparatus, said electric control apparatus comprising:

an ice detection element wholly contained within said ice making unit prior to installation of said ice making unit on said ice storage bin, said ice detection element being configured to be manually inserted into an interior of said ice storage bin after installation of said ice making unit on said ice storage bin, said ice detection element being provided for deactivating said electric control apparatus when the ice storage bin is full of ice;

connector means for connecting a source of electricity to said electric control apparatus by means of conductive wires, said connector means being arranged within said ice making unit to disconnect said electric control apparatus from said source of electricity when said ice detection element is wholly contained in said ice making unit, and to connect said electric control apparatus to said source of electricity only when said ice detection element has been inserted into the interior of said ice storage bin after said ice making unit has been installed on said ice storage bin.

2. An automatic ice making machine as recited in claim 1, wherein a range of movement of said connector means is limited by a length of said conductive wires, wherein said conductive wires allow said electrical control apparatus to be connected to said source of electricity when said ice detection element has been inserted into the interior of the ice storage bin, and said conductive wires prevent said electric control apparatus from being connected to said source of electricity when the ice detection element is wholly contained in the ice making unit.

3. A method for assembling an automatic ice making machine, comprising the steps of:

providing an ice making unit having an electric control apparatus for an ice making mechanism contained therein;

providing an ice storage bin to store therein an amount of ice cubes or chips formed by an operation of the ice making mechanism;

providing an ice detection element wholly contained within said ice making unit;

providing a connector in said ice making unit for connecting and disconnecting the electric control apparatus from a source of electricity, said connector being attached to conductive wires having a predetermined length;

installing said ice making unit on said ice storage bin;

moving said ice detection element from a first position wholly contained within said ice making unit to a second position wherein said ice detection element is inserted into an interior of said ice storage bin; and connecting said connector from said source of electricity to said electric control apparatus, thereby enabling operation of said ice making machine, wherein said connector means is prohibited by the length of the conductor wires from being attached to said electric control apparatus until said ice detection element is inserted into an interior of the ice storage bin.

* * * * *